(12) United States Patent
Liu et al.

(10) Patent No.: US 10,750,493 B2
(45) Date of Patent: Aug. 18, 2020

(54) METHOD AND DEVICE IN UE AND BASE STATION FOR UNLICENSED SPECTRUM

(71) Applicant: SHANGHAI LANGBO COMMUNICATION TECHNOLOGY COMPANY LIMITED, Shanghai (CN)

(72) Inventors: Zheng Liu, Shanghai (CN); Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/297,715

(22) Filed: Mar. 11, 2019

(65) Prior Publication Data
US 2019/0281592 A1    Sep. 12, 2019

(30) Foreign Application Priority Data
Mar. 12, 2018    (CN) .......................... 2018 1 0200881

(51) Int. Cl.
*H04W 72/04*    (2009.01)
(52) U.S. Cl.
CPC ................................. *H04W 72/044* (2013.01)
(58) Field of Classification Search
CPC .......... H04W 72/044; H04W 72/1289; H04W 72/1294; H04W 72/1278; H04W 88/08; H04W 88/02; H04W 76/046; H04W 84/12; H04W 72/082; H04W 16/28; H04W 72/0446; H04W 36/0083; H04W 36/0066; H04W 36/0072; H04W 4/70; H04W 76/11; H04W 76/27; H04L 27/0006; H04L 5/001; H04L 5/0091; H04L 5/0053; H04L 5/0055; H04L 5/0007; H04L 5/0005;
(Continued)

(56) References Cited
U.S. PATENT DOCUMENTS

2013/0058240 A1* 3/2013 Kim .................. H04L 5/0007
                                                          370/252
2013/0223366 A1* 8/2013 Papasakellariou .... H04L 5/0007
                                                          370/329
(Continued)

*Primary Examiner* — Jung Liu
(74) *Attorney, Agent, or Firm* — Maschoff Brennan

(57) ABSTRACT

The disclosure provides a method and a device in a User Equipment (UE) and base station for unlicensed spectrum. The UE first monitors a first signaling, and then, if the first signaling is detected, monitors a second signaling, or receives a first radio signal, wherein the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal. The disclosure can improve the utilization of unlicensed spectrum resources.

16 Claims, 12 Drawing Sheets

(58) Field of Classification Search
CPC ....... H04L 1/0046; H04L 69/324; H04L 5/14; H01Q 3/00; H04J 11/0023; H04B 7/0686
See application file for complete search history.

(56) References Cited

U.S. PATENT DOCUMENTS

| | | | |
|---|---|---|---|
| 2015/0043396 A1* | 2/2015 | Ekpenyong | H04L 5/1469 370/280 |
| 2015/0296542 A1* | 10/2015 | Heo | H04W 74/0833 370/329 |
| 2016/0057740 A1* | 2/2016 | Ko | H04W 88/02 370/329 |
| 2016/0374141 A1* | 12/2016 | He | H04W 72/082 |
| 2018/0070356 A1* | 3/2018 | He | H04W 72/02 |
| 2018/0359068 A1* | 12/2018 | Kim | H04W 72/0406 |
| 2019/0306737 A1* | 10/2019 | Kwak | H04W 24/08 |

* cited by examiner

METHOD AND DEVICE IN UE AND BASE STATION FOR UNLICENSED SPECTRUM

CROSS REFERENCE TO RELATED APPLICATION

This application claims the priority benefit of Chinese Patent Application Serial Number 201810200881.X, filed on Mar. 12, 2018, the full disclosure of which is incorporated herein by reference.

BACKGROUND

Technical Field

The disclosure relates to transmission methods and devices in wireless communication systems, and in particular to transmission schemes and devices for unlicensed spectrum.

Related Art

Application scenarios of future wireless communication systems are becoming increasingly diversified, and different application scenarios have different performance requirements for systems. In order to meet different performance requirements of various application scenarios, at the 3rd Generation Partner Project (3GPP) Radio Access Network (RAN) #72 plenary meeting, it was decided to conduct the study of New Radio (NR). The Work Item (WI) of NR was approved at the 3GPP RAN #75 plenary meeting to commence the normative work for NR.

In order to be able to adapt to a variety of application scenarios and meet different requirements, at the 3GPP RAN #75 meeting, a study item of access of unlicensed spectrum under NR was also approved. It is expected to accomplish the study item in R15 and then initiate the W1 in R16 to standardize relevant technologies.

SUMMARY

The 5G NR unlicensed spectrum probably includes a lot of spectrums within millimeter-wave frequency range. The spectrums within millimeter-wave frequency range have much larger available bandwidths than the existing licensed spectrum and low-frequency (e.g., 5 GHz and lower) spectrum. An introduction of a concept similar to Bandwidth Part (BWP) in 5G NR may greatly improve the flexibility and spectrum efficiency of unlicensed spectrum in 5G NR. However, on the other hand, since the application of Listen Before Talk (LBT) in unlicensed spectrum could cause a large uncertainty to the use and adaption of BWP, especially to operations performed before a UE-specific scheduling signaling is received (for example, reception of system information and initial access configurations), existing designs in 5G NR are very difficult to be reused directly.

In view of the subband (for example, BWP) based transmissions in unlicensed spectrum in 5G NR, the disclosure provides a solution. It should be noted that embodiments in the base station of the disclosure and the characteristics in the embodiments may be applied to the UE if no conflict is incurred, and vice versa. Further, the embodiments of the disclosure and the characteristics in the embodiments may be mutually combined if no conflict is incurred.

The disclosure provides a method in a User Equipment (UE) for wireless communication, wherein the method includes:

monitoring a first signaling; and
when the first signaling is detected, monitoring a second signaling, or receiving a first radio signal.

Herein, the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

In one embodiment, the UE determines a subband for reception of subsequent system information or downlink data according to the indication of the first signaling, thereby being capable of quickly determining a subband or BWP that can be used for downlink transmissions according to a result of LBT. This guarantees the fast transmission of system information or downlink data in available time resources, avoids the transmission failure due to the restriction of available time resources in unlicensed spectrums, improves resource utilization, and reduces latency.

In one embodiment, the first signaling is interpreted differently according to the indication of the first field in the first signaling, thus, occupation of radio resources in unlicensed spectrums can be indicated and system information scheduling signalings can be multiplexed, the flexibility of configuration can be improved and the number of blind detections can be reduced.

According to one aspect of the disclosure, the above method is characterized in that: a first bit block is used for generating the first signaling after being processed through channel coding, a second bit block is used for generating the second signaling after being processed through channel coding, the first bit block includes a positive integer number of bits, the second bit block includes a positive integer number of bits, and the number of bits included in the first bit block is smaller than the number of bits included in the second bit block.

According to one aspect of the disclosure, the above method is characterized in that: a first identification is used for the detection of the first signaling, a second identification is used for the detection of the second signaling, and the first identification is different from the second identification.

According to one aspect of the disclosure, the above method further includes:

receiving a second radio signal.

Herein, the second signaling is used for determining at least one of time-domain resources occupied by the second radio signal and frequency-domain resources occupied by the second radio signal; and the second radio signal is transmitted via the air interface.

According to one aspect of the disclosure, the above method further comprises:

receiving first information.

Herein, the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface.

According to one aspect of the disclosure, the above method is characterized in that: output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

The disclosure provides a method in a base station for wireless communication, wherein the method includes:

transmitting a first signaling; and transmitting a second signaling, or transmitting a first radio signal.

Herein, the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

According to one aspect of the disclosure, the above method is characterized in that: a first bit block is used for generating the first signaling after being processed through channel coding, a second bit block is used for generating the second signaling after being processed through channel coding, the first bit block includes a positive integer number of bits, the second bit block includes a positive integer number of bits, and the number of bits included in the first bit block is smaller than the number of bits included in the second bit block.

According to one aspect of the disclosure, the above method is characterized in that: a first identification is used for the detection of the first signaling, a second identification is used for the detection of the second signaling, and the first identification is different from the second identification.

According to one aspect of the disclosure, the above method includes:

transmitting a second radio signal.

Herein, the second signaling is used for determining at least one of time-domain resources occupied by the second radio signal and frequency-domain resources occupied by the second radio signal; and the second radio signal is transmitted via the air interface.

According to one aspect of the disclosure, the above method includes:

transmitting first information.

Herein, the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface.

According to one aspect of the disclosure, the above method is characterized in that: output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

The disclosure provides a UE for wireless communication, wherein the UE includes:

a first receiver, to monitor a first signaling; and a second receiver, when the first signaling is detected, to monitor a second signaling, or to receive a first radio signal.

Herein, the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

According to one aspect of the disclosure, the above UE is characterized in that: a first bit block is used for generating the first signaling after being processed through channel coding, a second bit block is used for generating the second signaling after being processed through channel coding, the first bit block includes a positive integer number of bits, the second bit block includes a positive integer number of bits, and the number of bits included in the first bit block is smaller than the number of bits included in the second bit block.

According to one aspect of the disclosure, the above UE is characterized in that: a first identification is used for the detection of the first signaling, a second identification is used for the detection of the second signaling, and the first identification is different from the second identification.

According to one aspect of the disclosure, the above UE is characterized in that: the second receiver further receives a second radio signal; wherein the second signaling is used for determining at least one of time-domain resources occupied by the second radio signal and frequency-domain resources occupied by the second radio signal; and the second radio signal is transmitted via the air interface.

According to one aspect of the disclosure, the above UE is characterized in that: the first receiver further receives first information; wherein the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface.

According to one aspect of the disclosure, the above UE is characterized in that: output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

The disclosure provides a base station for wireless communication, wherein the base station includes:

a first transmitter, to transmit a first signaling; and
a second transmitter, to transmit a second signaling, or transmit a first radio signal.

Herein, the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

According to one aspect of the disclosure, the above base station is characterized in that: a first bit block is used for generating the first signaling after being processed through channel coding, a second bit block is used for generating the second signaling after being processed through channel coding, the first bit block includes a positive integer number of bits, the second bit block includes a positive integer number of bits, and the number of bits included in the first bit block is smaller than the number of bits included in the second bit block.

According to one aspect of the disclosure, the above base station is characterized in that: a first identification is used for the detection of the first signaling, a second identification is used for the detection of the second signaling, and the first identification is different from the second identification.

According to one aspect of the disclosure, the above base station is characterized in that: the second transmitter further transmits a second radio signal; wherein the second signaling is used for determining at least one of time-domain resources occupied by the second radio signal and frequency-domain resources occupied by the second radio signal; and the second radio signal is transmitted via the air interface.

According to one aspect of the disclosure, the above base station is characterized in that: the first transmitter further transmits first information; wherein the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface.

According to one aspect of the disclosure, the above base station is characterized in that: output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

In one embodiment, the disclosure mainly has the following technical effects.

According to the method in the disclosure, the downlink transmission (including scheduling of system information and scheduling of data or transmission of system information) in unlicensed spectrum can adapt to a subband (or BWP) according to a result of LBT, thus, the downlink transmission can be carried out as quickly as possible in the condition of conforming to limits of regulations of unlicensed spectrum, resource utilization can be improved and transmission latency can be reduced.

According to the method in the disclosure, information in DCIs (for example, similar to DCIs scrambled with CC-RNTI in LTE LAA) used for indicating remaining time-frequency resources in unlicensed spectrum and information in DCIs (for example, DCIs scrambled with SI-RNTI) for system message scheduling are reinterpreted according to identification bit(s), thus, the flexibility of configuration is improved, the number of blind detections is reduced, and the complexity of standardization is reduced.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if there is no conflict.

Embodiment 1

Figure 1:
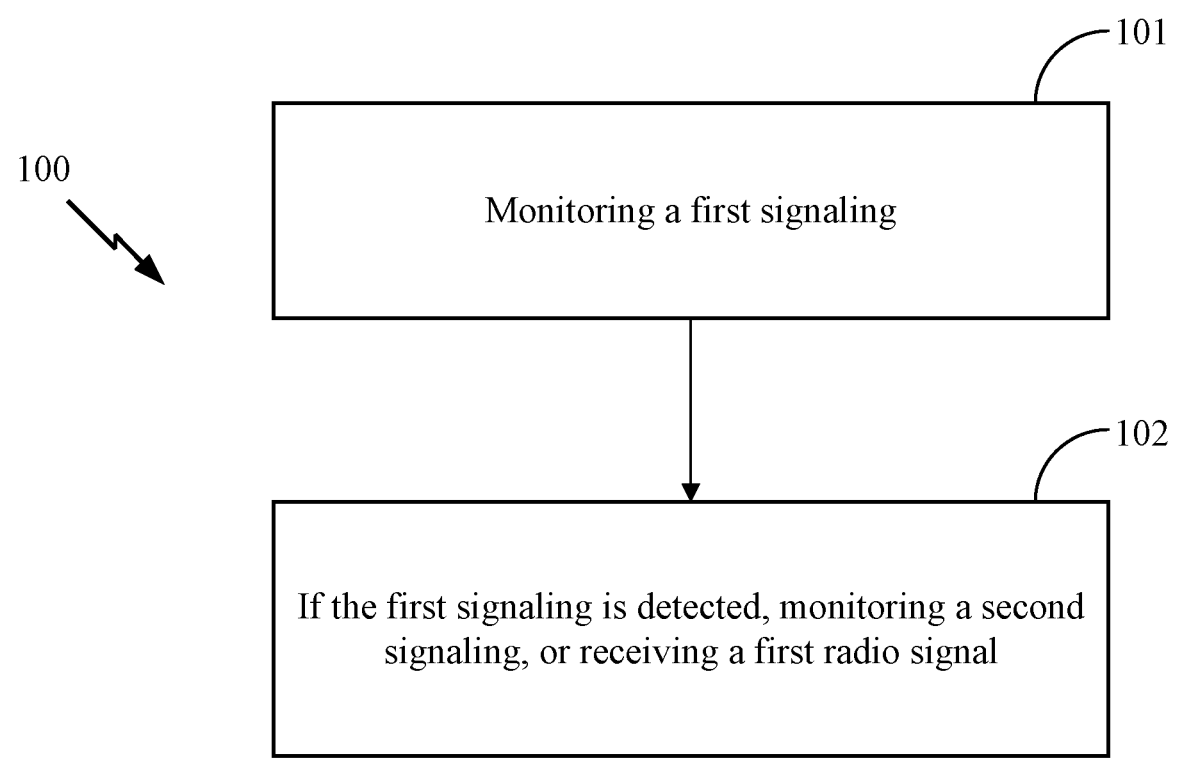
FIG. 1 is a flowchart of transmissions of a first signaling, a second signaling or a first radio signal according to one embodiment of the disclosure.

Embodiment 1 illustrates a flowchart of transmissions of a first signaling, a second signaling or a first radio signal according to one embodiment of the disclosure, as shown in FIG. 1. In FIG. 1, each box represents a step. In Embodiment 1, the UE in the disclosure first monitors a first signaling, and then, when the first signaling is detected, monitors a second signaling, or receives a first radio signal, wherein the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

In one embodiment, the monitoring of the first signaling is realized through a blind detection.

In one embodiment, the monitoring of the second signaling is realized through a blind detection.

In one embodiment, if the first signaling is not detected, the UE assumes that the first signaling is not transmitted, and the UE assumes that the second signaling or the first radio signal is not transmitted.

In one embodiment, if the first signaling is detected, but the second signaling is not detected, the UE assumes that the second signaling is not transmitted.

In one embodiment, both the first signaling and the second signaling are physical layer signalings.

In one embodiment, the first signaling carries high-layer information.

In one embodiment, the second signaling carries high-layer information.

In one embodiment, the first signaling is transmitted through a Physical Downlink Control Channel (PDCCH).

In one embodiment, the second signaling is transmitted through a PDCCH.

In one embodiment, the first signaling includes a DCI (Downlink Control Information).

In one embodiment, the second signaling includes a DCI.

In one embodiment, the first signaling is transmitted in a Common Search Space (CSS) of PDCCH.

In one embodiment, the second signaling is transmitted in a CSS of PDCCH.

In one embodiment, the second signaling is transmitted in a UE-Specific Search Space (USS) of PDCCH.

In one embodiment, the first signaling is broadcast or multicast.

In one embodiment, the second signaling is broadcast or multicast.

In one embodiment, the second signaling is unicast.

In one embodiment, both the first signaling and the second signaling are cell specific.

In one embodiment, both the first signaling and the second signaling are beam specific.

In one embodiment, the first radio signal is broadcast.

In one embodiment, the first radio signal is multicast.

In one embodiment, the first radio signal is unicast.

In one embodiment, the first radio signal is beam specific.

In one embodiment, the first radio signal is cell specific.

In one embodiment, the first radio signal carries a Radio Resource Control (RRC) signaling.

In one embodiment, the first radio signal carries Remaining System Information (RMSI).

In one embodiment, the first radio signal carries On-demand System Information (OSI).

In one embodiment, the first radio signal is transmitted through a Downlink Shared Channel (DL-SCH).

In one embodiment, the first radio signal is transmitted through a Physical Downlink Shared Channel (PDSCH).

In one embodiment, all or partial bits of a Transport Block (TB) are processed sequentially through TB-level Cyclic Redundancy Check (CRC) Attachment, Segmentation, coding block-level CRC Attachment, Channel Coding, Rate Matching, Concatenation, Scrambling, Modulation, Layer Mapper, Precoding, Mapping to Physical Resources, Baseband Signal Generation, Modulation and Upconversion to obtain the first radio signal.

In one embodiment, all or partial bits of a TB are processed sequentially through TB-level CRC Attachment, Channel Coding, Rate Matching, Scrambling, Modulation, Layer Mapper, Precoding, Mapping to Physical Resources, Baseband Signal Generation, Modulation and Upconversion to obtain the first radio signal.

In one embodiment, the first field in the first signaling is a flag.

In one embodiment, the first field in the first signaling is a given bit segment in the first signaling.

In one embodiment, the first field is a flag field in a DCI.

In one embodiment, the first sub-information includes all or partial fields in the first signaling other than the first field.

In one embodiment, the second sub-information includes all or partial fields in the first signaling other than the first field.

In one embodiment, the first signaling can include one of the first sub-information and the second sub-information.

In one embodiment, an interpretation of the first signaling other than the first field in the first signaling is defined by the first field in the first signaling.

In one embodiment, if the first field in the first signaling is different, the interpretation of the first signaling other than the first field in the first signaling is different.

In one embodiment, the phase that the first field in the first signaling is used for determining whether the first sub-information or the second sub-information is carried in the first signaling refers that: the first field in the first signaling is used for indicating explicitly whether the first sub-information or the second sub-information is carried in the first signaling.

In one embodiment, the phase that the first field in the first signaling is used for determining whether the first sub-information or the second sub-information is carried in the first signaling refers that: the first field in the first signaling is used for indicating implicitly whether the first sub-information or the second sub-information is carried in the first signaling.

In one embodiment, the phase that the first field in the first signaling is used for determining whether the first sub-information or the second sub-information is carried in the first signaling refers that: the first field in the first signaling is used for indicating directly whether the first sub-information or the second sub-information is carried in the first signaling.

In one embodiment, the phase that the first field in the first signaling is used for determining whether the first sub-information or the second sub-information is carried in the first signaling refers that: the first field in the first signaling is used for indicating indirectly whether the first sub-information or the second sub-information is carried in the first signaling.

In one embodiment, the phase that the first field in the first signaling is used for determining whether the first sub-information or the second sub-information is carried in the first signaling refers that: the first field in the first signaling is used for determining an interpretation of the field in the first signaling other than the first field, the first sub-information and the second sub-information are two interpretations of the field in the first signaling other than the first field.

In one embodiment, both the first information and the second information are physical layer information.

In one embodiment, the first information includes high-layer information.

In one embodiment, the second information includes high-layer information.

In one embodiment, the phase that the first sub-information is used for determining a first time-frequency resource pool refers that: the first sub-information is used by the UE to determine the first time-frequency resource pool.

In one embodiment, the phase that the first sub-information is used for determining a first time-frequency resource pool refers that: the first sub-information indicates directly the first time-frequency resource pool.

In one embodiment, the phase that the first sub-information is used for determining a first time-frequency resource pool refers that: the first sub-information indicates indirectly the first time-frequency resource pool.

In one embodiment, the phase that the first sub-information is used for determining a first time-frequency resource pool refers that: the first sub-information indicates explicitly the first time-frequency resource pool.

In one embodiment, the phase that the first sub-information is used for determining a first time-frequency resource pool refers that: the first sub-information indicates implicitly the first time-frequency resource pool.

In one embodiment, the phase that the second sub-information is used for determining time-frequency resources occupied by the first radio signal refers that: the second sub-information is used by the UE to determine time-frequency resources occupied by the first radio signal.

In one embodiment, the phase that the second sub-information is used for determining time-frequency resources occupied by the first radio signal refers that: the second sub-information indicates directly time-frequency resources occupied by the first radio signal.

In one embodiment, the phase that the second sub-information is used for determining time-frequency resources occupied by the first radio signal refers that: the second sub-information indicates indirectly time-frequency resources occupied by the first radio signal.

In one embodiment, the phase that the second sub-information is used for determining time-frequency resources occupied by the first radio signal refers that: the second sub-information indicates explicitly time-frequency resources occupied by the first radio signal.

In one embodiment, the phase that the second sub-information is used for determining time-frequency resources occupied by the first radio signal refers that: the second sub-information indicates implicitly time-frequency resources occupied by the first radio signal.

In one embodiment, default frequency-domain resources of the first time-frequency resource pool and a Control Resource Set (CORESET) of the first signaling are the same.

In one embodiment, the first time-frequency resource pool is remaining time-frequency resources in a given frequency band in a Max Channel Occupy Time (MCOT) after the first signaling is transmitted.

In one embodiment, time-frequency resources occupied by the second signaling are the first time-frequency resource pool.

In one embodiment, the first time-frequency resource pool further includes time-frequency resources other than the time-frequency resources occupied by the second signaling.

In one embodiment, frequency-domain resources of the first time-frequency resource pool are a frequency band on which a transmitter of the first signaling performs LBT.

In one embodiment, the first time-frequency resource pool is occupied by a transmitter of the first signaling.

In one embodiment, the first time-frequency resource pool is occupied by a transmitter of the first signaling in the condition that the first time-frequency resource pool meets the requirements of a frequency domain occupation ratio or a time domain duty cycle of unlicensed spectrum.

In one embodiment, a transmitter of the first signaling transmits signals on all time-frequency resources in the first time-frequency resource pool.

In one embodiment, a transmitter of the first signaling transmits signals on partial time-frequency resources in the first time-frequency resource pool, and the time-frequency resources in the first time-frequency resource pool on which the transmitter of the first signaling transmits signals meet requirements of regulations of the unlicensed spectrum to which the time-frequency resources belong.

In one embodiment, a transmitter of the first signaling transmits signals on partial time-frequency resources in the first time-frequency resource pool, and the time-frequency resources in the first time-frequency resource pool on which the transmitter of the first signaling transmits signals meet requirements of a frequency domain occupation ratio or a time domain duty ratio of the unlicensed spectrum to which the time-frequency resources belong.

In one embodiment, a transmitter of the first signaling can assume that the first time-frequency resource pool is controlled and used by the transmitter of the first signaling alone.

In one embodiment, a transmitter of the first signaling can assume that the first time-frequency resource pool is occupied by the transmitter of the first signaling.

In one embodiment, the air interface is wireless.

In one embodiment, the air interface includes a wireless channel.

In one embodiment, the air interface is an interface between a second-type communication node and the first-type communication node.

Embodiment 2

Figure 2:
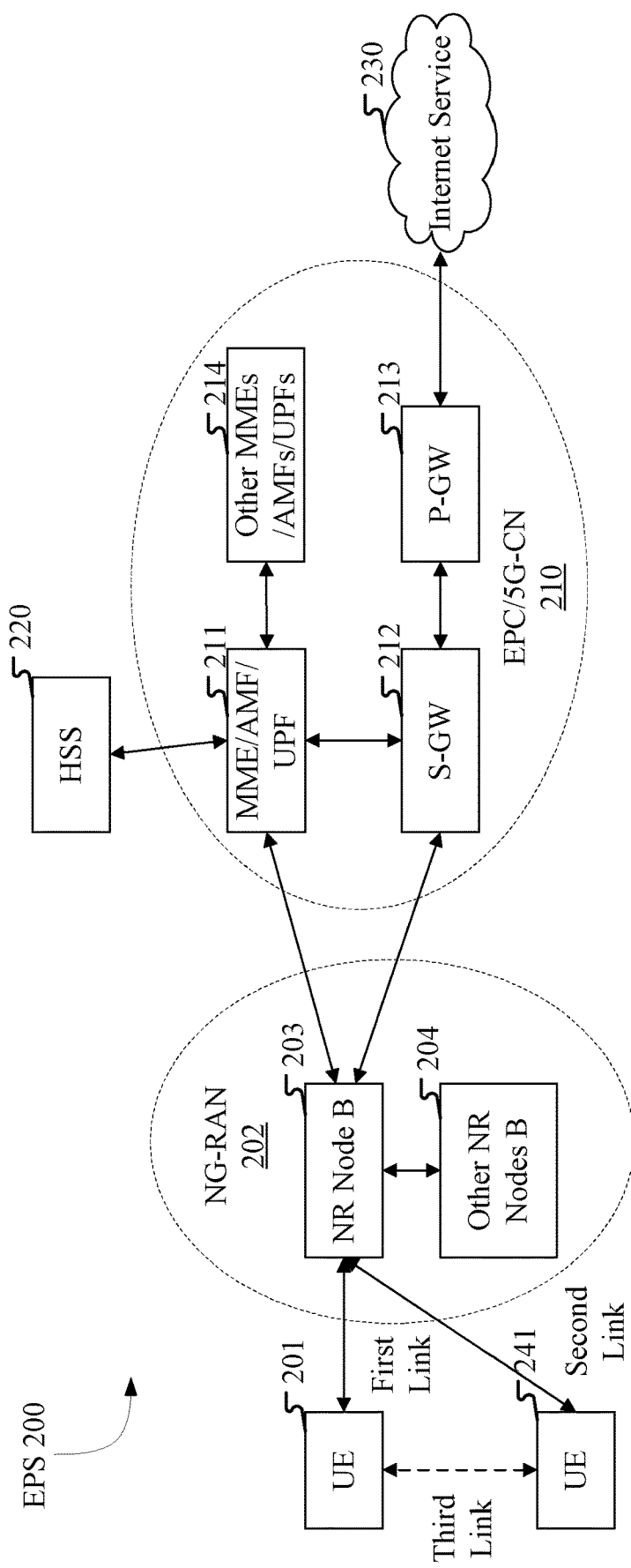
FIG. 2 is a diagram illustrating a network architecture according to one embodiment of the disclosure.

Embodiment 2 illustrates an example of a diagram of a network architecture according to the disclosure, as shown in FIG. 2. FIG. 2 is a diagram illustrating a network architecture 200 of NR LTE and Long-Term Evolution Advanced (LTE-A) systems. The NR 5G or LTE network architecture 200 may be called an Evolved Packet System (EPS) 200. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP (Transmit Receive Point) or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the UE 201 supports transmission on unlicensed spectrum.

In one embodiment, the gNB 203 corresponds to the base station in the disclosure.

In one embodiment, the gNB 203 supports transmission on unlicensed spectrum.

Embodiment 3

Figure 3:
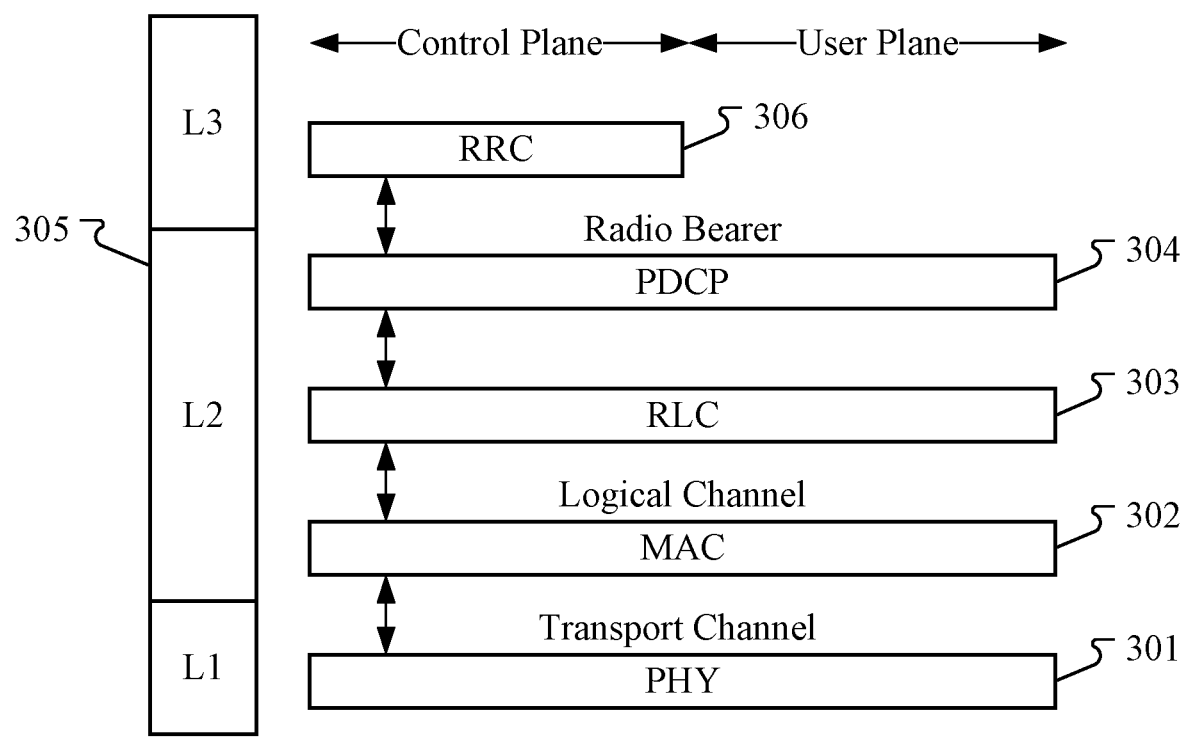
FIG. 3 is a diagram illustrating a radio protocol architecture of a user plane and a control plane according to one embodiment of the disclosure.

Embodiment 3 is a diagram illustrating a radio protocol architecture of a user plane and a control plane according to the disclosure, as shown in FIG. 3. FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW 213 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overhead. The PDCP sublayer 304 provides security by encrypting packets and provides support for UE handover between gNBs. The RLC sublayer 303 provides segmentation and reassembling of higher-layer packets, retransmission of lost packets, and reordering of lost packets so as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the first signaling in the disclosure is generated by the PHY 301.

In one embodiment, the first signaling in the disclosure is generated by the MAC 302.

In one embodiment, the first signaling in the disclosure is generated by the RRC 306.

In one embodiment, the second signaling in the disclosure is generated by the PHY 301.

In one embodiment, the second signaling in the disclosure is generated by the MAC 302.

In one embodiment, the second signaling in the disclosure is generated by the RRC 306.

In one embodiment, the first radio signal in the disclosure is generated by the RRC 306.

In one embodiment, the first radio signal in the disclosure is generated by the MAC 302.

In one embodiment, the first radio signal in the disclosure is generated by the PHY 301.

In one embodiment, the second radio signal in the disclosure is generated by the RRC 306.

In one embodiment, the second radio signal in the disclosure is generated by the MAC 302.

In one embodiment, the second radio signal in the disclosure is generated by the PHY 301.

In one embodiment, the first information in the disclosure is generated by the RRC 306.

In one embodiment, the first information in the disclosure is generated by the MAC 302.

In one embodiment, the first information in the disclosure is generated by the PHY 301.

Embodiment 4

Figure 4:
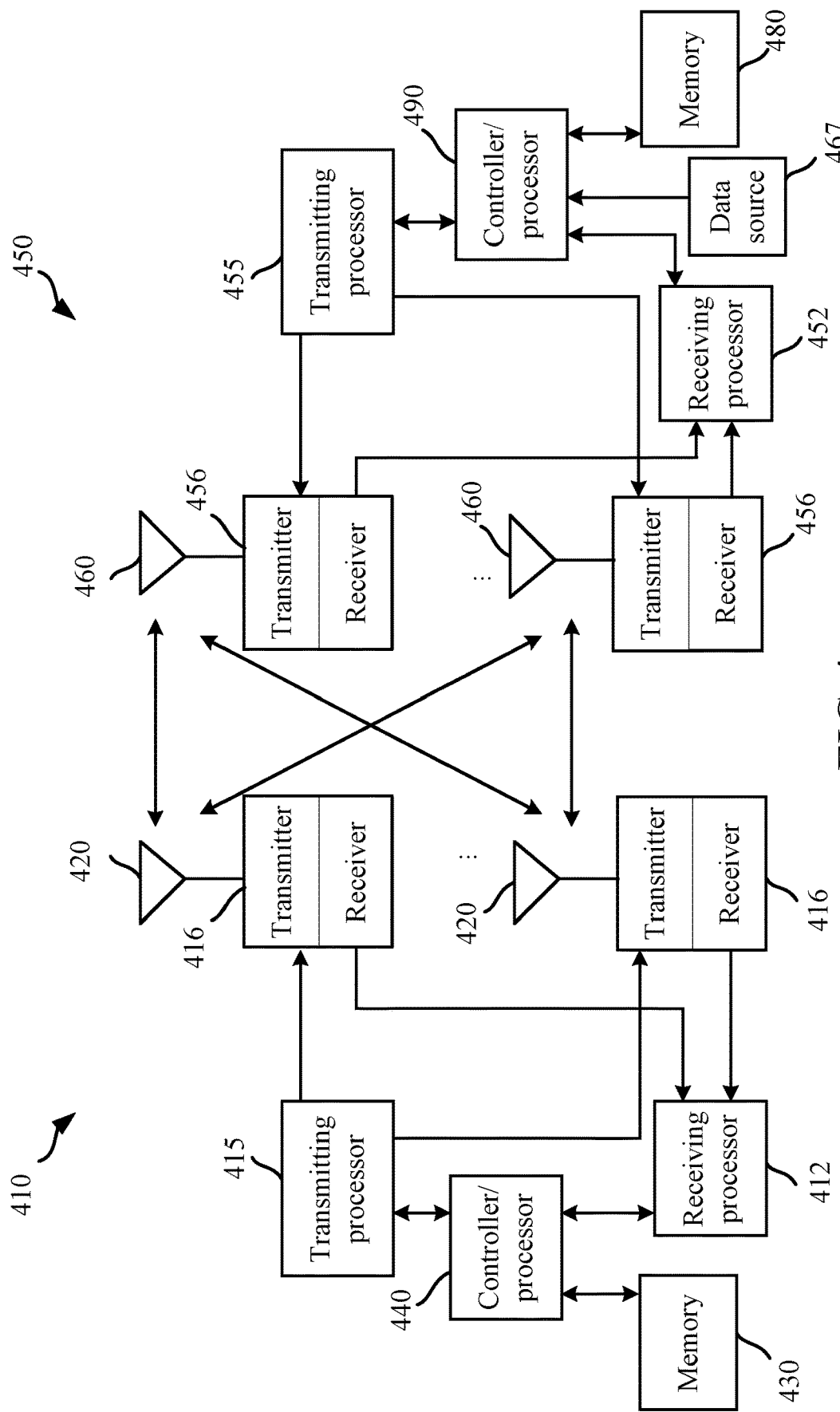
FIG. 4 is a diagram illustrating a base station and a UE according to one embodiment of the disclosure.

Embodiment 4 illustrates a diagram of a base station and a given UE according to the disclosure, as shown in FIG. 4. FIG. 4 is a block diagram of a gNB 410 in communication with a UE 450 in an access network.

The base station 410 may include a controller/processor 440, a memory 430, a receiving processor 412, a transmitter/receiver 416 and a transmitting processor 415. The transmitter/receiver 416 includes an antenna 420. Higher-layer packets are provided to the controller/processor 440. The controller/processor 440 provides header compression/decompression, encryption/decryption, packet segmentation and reordering, multiplexing/de-multiplexing between a logical channel and a transport channel, to implement L2 protocols used for the user plane and the control plane. The higher-layer packet may include data or control information, for example, DL-SCH or UL-SCH. The transmitting processor 415 performs signal transmitting processing functions of L1 layer (that is, PHY), including encoding, interleaving, scrambling, modulation, power control/allocation, precoding, generation of physical layer control signalings (including PBCH, PDCCH, PHICH, PCFICH, reference signal), etc. The receiving processor 412 performs signal receiving processing functions of L1 layer (that is, PHY), including decoding, de-interleaving, descrambling, demodulation, de-precoding, extraction of physical layer control signalings, etc. The transmitter 416 is configured to convert a baseband signal provided by the transmitting processor 415 into a radio-frequency signal and transmit the radio-frequency signal via the antenna 420. The receiver 416 is configured to convert a radio-frequency signal received via the antenna 420 into a baseband signal and provide the baseband signal to the receiving processor 412.

The UE 450 includes a controller/processor 490, a memory 480, a receiving processor 452, a transmitter/receiver 456, a transmitting processor 455, and a data source 467. The transmitter/receiver 456 includes an antenna 460. The data source 467 provides higher-layer packets to the controller/processor 490. The controller/processor 490 provides header compression/decompression, encryption/decryption, packet segmentation and reordering, multiplexing/de-multiplexing between a logical channel and a transport channel, to implement L2 protocols used for the user plane and the control plane. The higher-layer packet may include data or control information, for example, DL-SCH or UL-SCH. The transmitting processor 455 performs signal transmitting processing functions of L1 layer (that is, PHY), including encoding, interleaving, scrambling, modulation, power control/allocation, precoding, generation of physical layer control signalings, etc. The receiving processor 452 performs signal receiving processing functions of L1 layer (that is, PHY), including decoding, de-interleaving, descrambling, demodulation, de-precoding, extraction of physical layer control signalings, etc. The transmitter 456 is configured to convert a baseband signal provided by the transmitting processor 455 into a radio-frequency signal and transmit the radio-frequency signal via the antenna 460. The receiver 456 is configured to convert a radio-frequency signal received via the antenna 460 into a baseband signal and provide the baseband signal to the receiving processor 452.

In Downlink (DL) transmission, a higher-layer packet DL-SCH, including the first radio signal, the second radio signal and the first information in the disclosure, is provided to the controller/processor 440. The controller/processor 440 performs functions of L2 layer. In downlink transmission, the controller/processor 440 provides header compression, encryption, packet segmentation and reordering, multiplexing between a logical channel and a transport channel, and radio resource allocation for the UE 450 based on various priority metrics. The controller/processor 440 is also in charge of HARQ operation, retransmission of lost packets, and signalings to the UE 450. The transmitting processor 415 performs signal processing functions of L1 layer (that is, PHY). Physical layer signals of the first signaling, the second signaling, the first radio signal, the second radio signal and the first information in the disclosure are generated at the transmitting processor 415. The signal processing function includes coding and interleaving, so as to facilitate FEC (Forward Error Correction) at the UE 450 side and demodulation of baseband signals corresponding to different modulation schemes (i.e., BPSK, QPSK, etc.). The modulated symbols are split into parallel streams. Each of the parallel streams is mapped to corresponding subcarriers of multi-carriers and/or multi-carrier symbols. Then the transmitting processor 415 maps the parallel streams to the antenna 420 via the transmitter 416 so as to transmit the parallel streams in the form of Radio Frequency (RF) signals. At the receiving side, every receiver 456 receives a radio frequency signal via the corresponding antenna 460. Every receiver 456 recovers the baseband information modulated to the RF carrier and provides the baseband information to the receiving processor 452. The receiving processor 452 performs signal receiving processing functions of L1 layer. The signal receiving processing functions include detecting the first signaling and the second signaling, and receiving the physical layer signals of the first radio signal, the second radio signal and the first information in the disclosure, conducting demodulation corresponding to different modulation schemes (i.e., BPSK, QPSK, etc.) through multi-carrier symbols in multi-carrier symbol streams, then decoding and de-interleaving to recover the data or control signals transmitted by the gNB 410 on the physical channel, and then providing the data and control signals to the controller/processor 490. The controller/processor 490 performs functions of L2 layer. The controller/ processor may be connected to the memory 480 that stores program codes and data. The memory 480 may be called a computer readable medium.

In one embodiment, the UE 450 corresponds to the UE in the disclosure.

In one embodiment, the gNB 410 corresponds to the base station in the disclosure.

In one embodiment, the UE 450 device includes at least one processor and at least one memory. The at least one memory includes computer program codes. The at least one memory and the computer program codes are configured to be used in collaboration with the at least one processor. The UE 450 device at least monitors a first signaling, and, when the first signaling is detected, monitors a second signaling, or receives a first radio signal; wherein the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

In one embodiment, the UE 450 includes a memory that stores a computer readable instruction program. The computer readable instruction program generates an action when executed by at least one processor. The action includes monitoring a first signaling, and, when the first signaling is detected, monitoring a second signaling, or receiving a first radio signal; wherein the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

In one embodiment, the gNB 410 includes at least one processor and at least one memory. The at least one memory includes computer program codes. The at least one memory and the computer program codes are configured to be used in collaboration with the at least one processor. The gNB 410 at least transmits a first signaling, and transmits a second signaling, or transmits a first radio signal; wherein the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

In one embodiment, the gNB 410 includes a memory that stores a computer readable instruction program. The computer readable instruction program generates an action when executed by at least one processor. The action includes transmitting a first signaling, and transmitting a second signaling, or transmitting a first radio signal; wherein the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

In one embodiment, the receiver 456 (including the antenna 460) and the receiving processor 452 are used to monitor the first signaling in the disclosure.

In one embodiment, the receiver 456 (including the antenna 460) and the receiving processor 452 are used to monitor the second signaling in the disclosure.

In one embodiment, the receiver 456 (including the antenna 460), the receiving processor 452 and the controller/processor 490 are used to receive the first radio signal in the disclosure.

In one embodiment, the receiver 456 (including the antenna 460), the receiving processor 452 and the controller/processor 490 are used to receive the second radio signal in the disclosure.

In one embodiment, the receiver 456 (including the antenna 460), the receiving processor 452 and the controller/processor 490 are used to receive the first information in the disclosure.

In one embodiment, the transmitter 416 (including the antenna 420) and the transmitting processor 415 are used to transmit the first signaling in the disclosure.

In one embodiment, the transmitter 416 (including the antenna 420) and the transmitting processor 415 are used to transmit the second signaling in the disclosure.

In one embodiment, the transmitter 416 (including the antenna 420), the transmitting processor 415 and the controller/processor 440 are used to transmit the first radio signal in the disclosure.

In one embodiment, the transmitter 416 (including the antenna 420), the transmitting processor 415 and the controller/processor 440 are used to transmit the second radio signal in the disclosure.

In one embodiment, the transmitter 416 (including the antenna 420), the transmitting processor 415 and the controller/processor 440 are used to transmit the first information in the disclosure.

Embodiment 5

Figure 5:
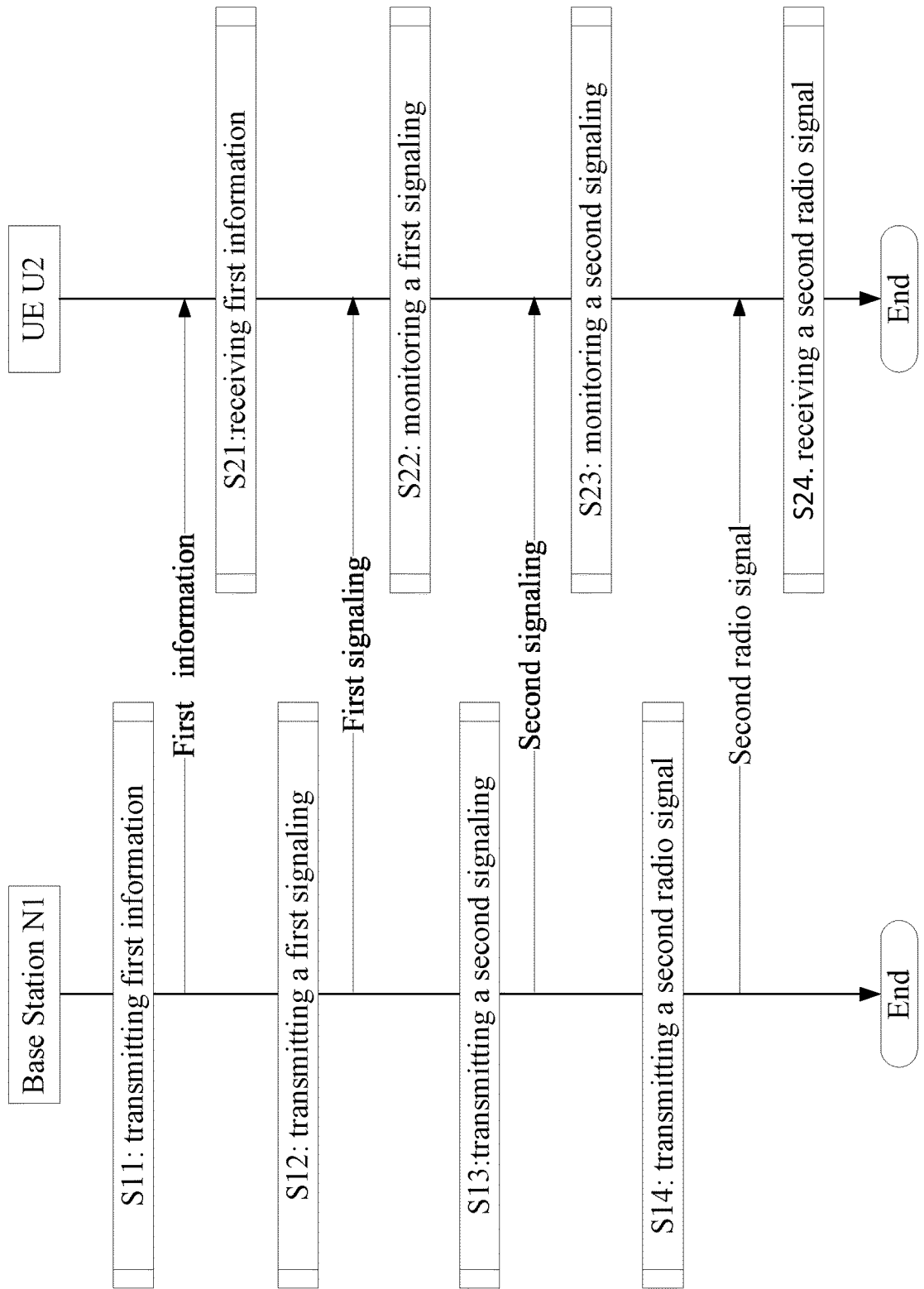
FIG. 5 is a flowchart illustrating the transmissions of radio signals according to one embodiment of the disclosure.

Embodiment 5 illustrates an example of a flowchart of the transmissions of radio signals according to one embodiment of the disclosure, as shown in FIG. 5. In FIG. 5, a base station N1 is a maintenance base station for a serving cell of a UE U2.

The base station N1 transmits first information in S11, transmits a first signaling in S12, transmits a second signaling in S13, and transmits a second radio signal in S14.

The UE U2 receives first information in S21, monitors a first signaling in S22, monitors a second signaling in S23, and receives a second radio signal in S14.

In Embodiment 5, the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, the second signaling is used for determining at least one of time-domain resources occupied by the second radio signal and frequency-domain resources occupied by the second radio signal; the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1.

In one embodiment, a first bit block is used for generating the first signaling after being processed through channel coding, a second bit block is used for generating the second signaling after being processed through channel coding, the first bit block includes a positive integer number of bits, the second bit block includes a positive integer number of bits, and the number of bits included in the first bit block is smaller than the number of bits included in the second bit block.

In one embodiment, a first identification is used for the detection of the first signaling, a second identification is used for the detection of the second signaling, and the first identification is different from the second identification.

In one embodiment, output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

In one embodiment, the second radio signal is broadcast.
In one embodiment, the second radio signal is multicast.
In one embodiment, the second radio signal is unicast.
In one embodiment, the second radio signal is beam specific.
In one embodiment, the second radio signal is cell specific.
In one embodiment, the second radio signal is UE specific.
In one embodiment, the second radio signal carries an RMSI.
In one embodiment, the second radio signal carries an OSI.

In one embodiment, the second radio signal is transmitted through a DL-SCH.
In one embodiment, the second radio signal is transmitted through a PDSCH.
In one embodiment, all or partial bits of a TB are processed sequentially through TB-level CRC Attachment, Segmentation, coding block-level CRC Attachment, Channel Coding, Rate Matching, Concatenation, Scrambling, Modulation, Layer Mapper, Precoding, Mapping to Physical Resources, Baseband Signal Generation, Modulation and Upconversion to obtain the second radio signal.

In one embodiment, all or partial bits of a TB are processed sequentially through TB-level CRC Attachment, Channel Coding, Rate Matching, Scrambling, Modulation, Layer Mapper, Precoding, Mapping to Physical Resources, Baseband Signal Generation, Modulation and Upconversion to obtain the second radio signal.

In one embodiment, the first information is transmitted through a high-layer signaling.
In one embodiment, the first information is transmitted through a physical-layer signaling.
In one embodiment, the first information includes part or all of a high-layer signaling.
In one embodiment, the first information includes part or all of a physical-layer signaling.
In one embodiment, the first information is transmitted through a Broadcast Channel (BCH).
In one embodiment, the first information is transmitted through a Physical Broadcast Channel (PBCH).
In one embodiment, the first information includes one or more fields in a Master Information Block (MIB).
In one embodiment, the first information is transmitted through a Downlink Shared Channel (DL-SCH).
In one embodiment, the first information is transmitted through a Physical Downlink Shared Channel (PDSCH).
In one embodiment, the first information includes one or more fields in a System Information Block (SIB).
In one embodiment, the first information includes one or more fields in an RMSI.
In one embodiment, the first information includes part or all of an RRC signaling.
In one embodiment, the first information is broadcast.
In one embodiment, the first information is unicast.
In one embodiment, the first information is cell specific.
In one embodiment, the first information is UE specific.
In one embodiment, the first information is transmitted through a PDCCH.
In one embodiment, the first information includes all or partial fields in a DCI signaling.
In one embodiment, the phase that the first information is used for determining the K1 frequency subbands refers that: the first information is used by the UE to determine the K1 frequency subbands.
In one embodiment, the phase that the first information is used for determining the K1 frequency subbands refers that: the first information indicates directly the K1 frequency subbands.
In one embodiment, the phase that the first information is used for determining the K1 frequency subbands refers that: the first information indicates indirectly the K1 frequency subbands.
In one embodiment, the phase that the first information is used for determining the K1 frequency subbands refers that: the first information indicates explicitly the K1 frequency subbands.

In one embodiment, the phase that the first information is used for determining the K1 frequency subbands refers that: the first information indicates implicitly the K1 frequency subbands.

Embodiment 6

Figure 6:
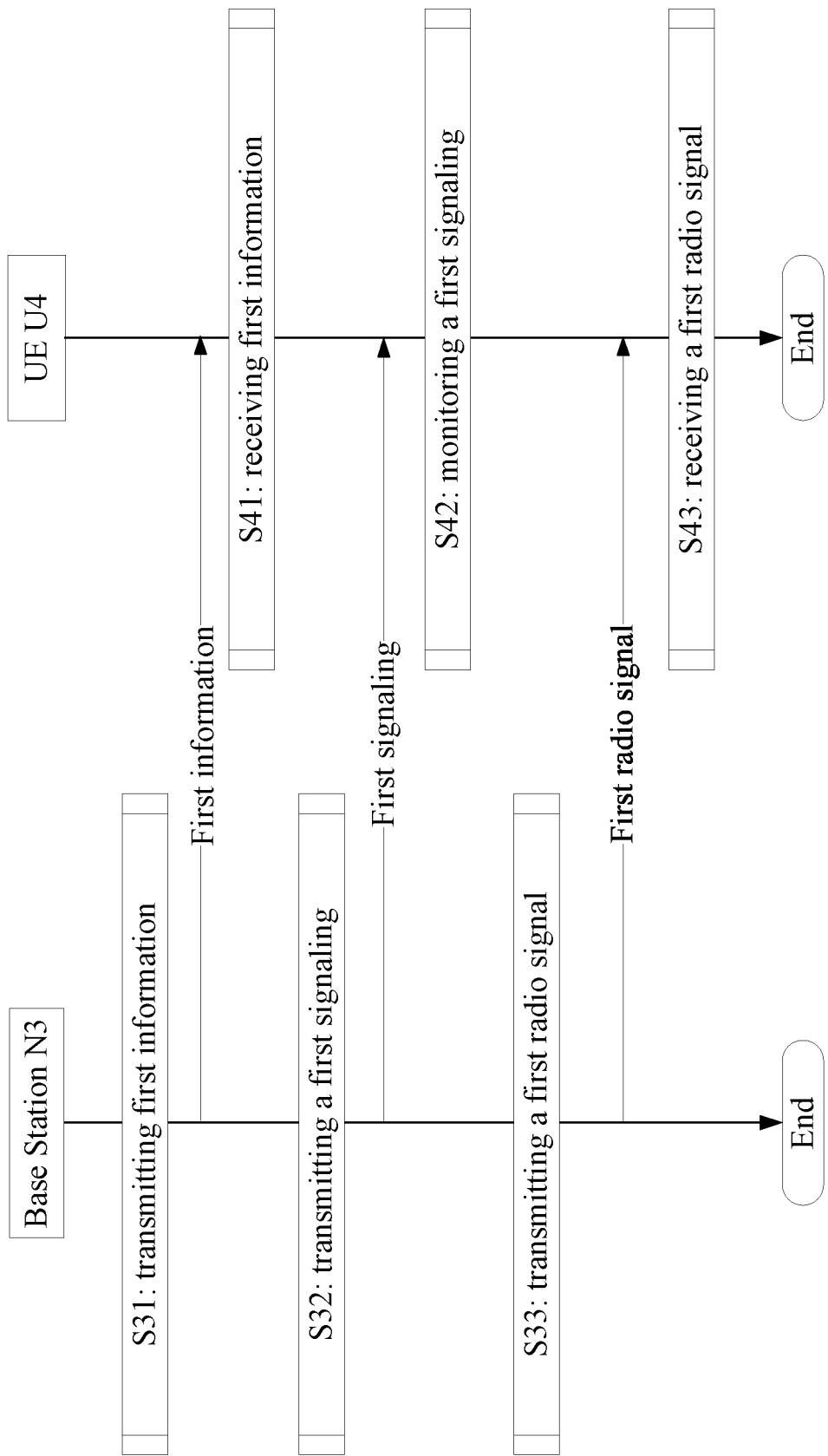
FIG. 6 is a flowchart illustrating the transmissions of radio signals according to another embodiment of the disclosure.

Embodiment 6 illustrates an example of a flowchart of the transmissions of radio signals according to another embodiment of the disclosure, as shown in FIG. 6. In FIG. 6, a base station N3 is a maintenance base station for a serving cell of a UE U4.

The base station N3 transmits first information in S31, transmits a first signaling in S32, and transmits a first radio signal in S33.

The UE U4 receives first information in S41, monitors a first signaling in S42, and receives a first radio signal in S43.

In Embodiment 6, the first signaling includes a first field; the first signaling carries first sub-information besides the first field, or the first signaling carries second sub-information besides the first field; the first field in the first signaling is used for determining whether the first sub-information or the second sub-information is carried in the first signaling; the second sub-information is used for determining time-frequency resources occupied by the first radio signal; the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1.

In one embodiment, a first bit block is used for generating the first signaling after being processed through channel coding, a second bit block is used for generating the second signaling after being processed through channel coding, the first bit block includes a positive integer number of bits, the second bit block includes a positive integer number of bits, and the number of bits included in the first bit block is smaller than the number of bits included in the second bit block.

In one embodiment, a first identification is used for the detection of the first signaling, a second identification is used for the detection of the second signaling, and the first identification is different from the second identification.

In one embodiment, output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

In one embodiment, the first radio signal is broadcast.
In one embodiment, the first radio signal is multicast.
In one embodiment, the first radio signal is unicast.
In one embodiment, the first radio signal is beam specific.
In one embodiment, the first radio signal is cell specific.
In one embodiment, the first radio signal carries an RRC signaling.

In one embodiment, the first radio signal carries an RMSI.
In one embodiment, the first radio signal carries an OSI.
In one embodiment, the first radio signal is transmitted through a DL-SCH.
In one embodiment, the first radio signal is transmitted through a PDSCH.

In one embodiment, all or partial bits of a TB are processed sequentially through TB-level CRC Attachment, Segmentation, coding block-level CRC Attachment, Channel Coding, Rate Matching, Concatenation, Scrambling, Modulation, Layer Mapper, Precoding, Mapping to Physical Resources, Baseband Signal Generation, Modulation and Upconversion to obtain the first radio signal.

In one embodiment, all or partial bits of a TB are processed sequentially through TB-level CRC Attachment, Channel Coding, Rate Matching, Scrambling, Modulation, Layer Mapper, Precoding, Mapping to Physical Resources, Baseband Signal Generation, Modulation and Upconversion to obtain the first radio signal.

Embodiment 7

Figure 7:
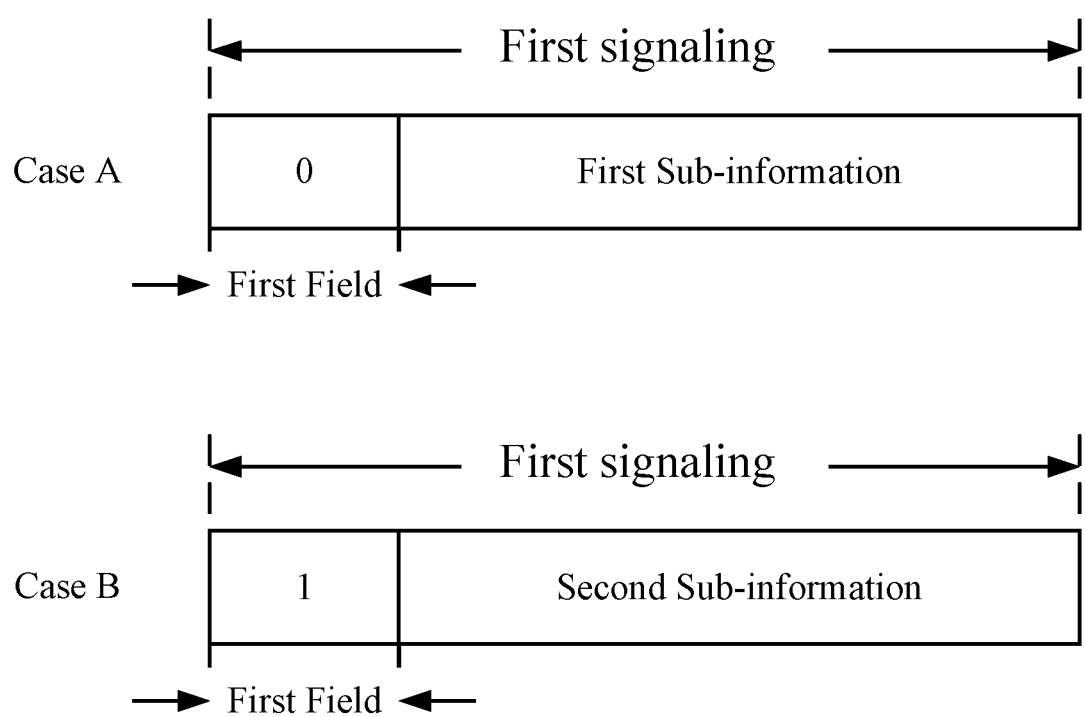
FIG. 7 is a diagram illustrating a relationship between a first field and first sub-information and a relationship between a first field and second sub-information according to one embodiment of the disclosure.

Embodiment 7 illustrates a diagram of a relationship between a first field and first sub-information and a relationship between a first field and second sub-information according to one embodiment of the disclosure, as shown in FIG. 7. In Case A in FIG. 7, the first field is set to 0, and the first signaling includes the first sub-information; in Case B, the first field is set to 1, and the first signaling includes the second sub-information.

In Embodiment 7, the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal.

In one embodiment, the monitoring of the first signaling is realized through a blind detection.

In one embodiment, the monitoring of the second signaling is realized through a blind detection.

In one embodiment, if the first signaling is not detected, the UE assumes that the first signaling is not transmitted, and the UE assumes that the second signaling or the first radio signal is not transmitted.

In one embodiment, if the first signaling is detected, but the second signaling is not detected, the UE assumes that the second signaling is not transmitted.

Embodiment 8

Figure 8:
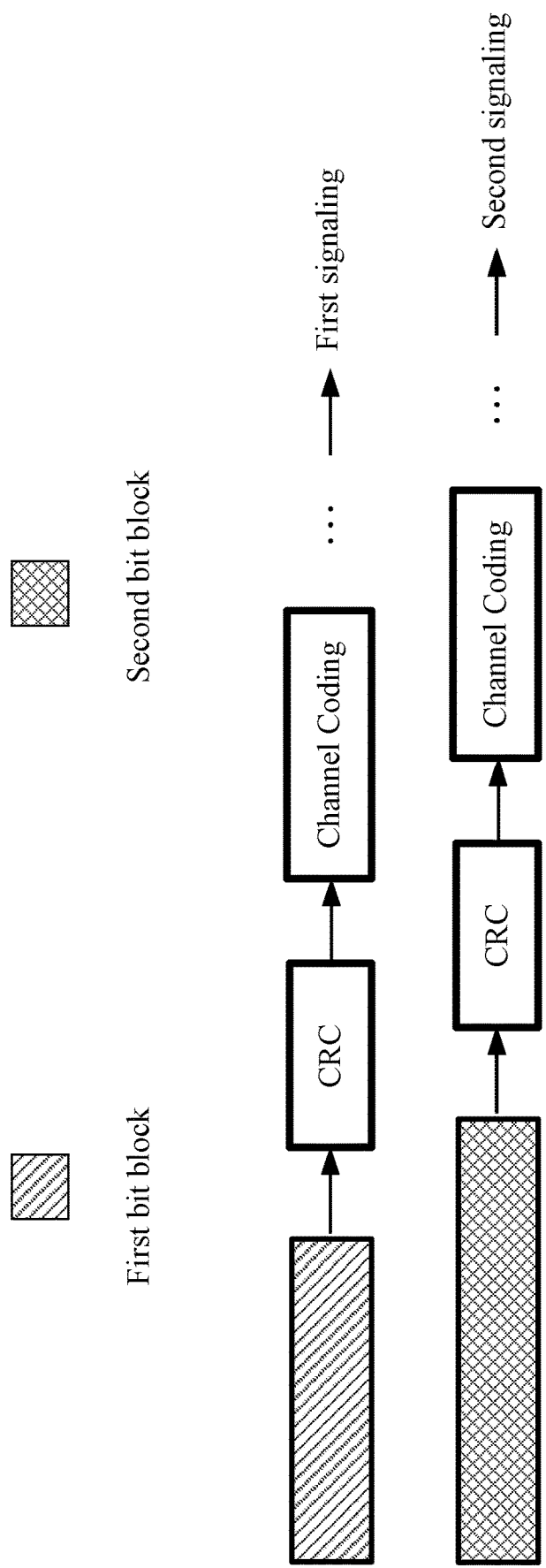
FIG. 8 is a diagram illustrating a first bit block and a second bit block according to one embodiment of the disclosure.

Embodiment 8 illustrates an example of a diagram of a first bit block and a second bit block according to one embodiment of the disclosure, as shown in FIG. 8. In FIG. 8, a rectangle filled by slashes represents a first bit block, and a rectangle filled by cross lines represents a second bit block.

In Embodiment 8, a first bit block is used for generating the first signaling in the disclosure after being processed through channel coding, a second bit block is used for generating the second signaling in the disclosure after being processed through channel coding, the first bit block includes a positive integer number of bits, the second bit block includes a positive integer number of bits, and the number of bits included in the first bit block is smaller than the number of bits included in the second bit block.

In one embodiment, the first bit block is processed sequentially through CRC Attachment, Channel Coding, Rate Matching, Scrambling, Modulation, Mapping to Physical Resources, Baseband Signal Generation, Modulation and Upconversion to obtain the first signaling.

In one embodiment, the first bit block is processed sequentially through Bit Padding, CRC Attachment, Channel Coding, Rate Matching, Scrambling, Modulation, Mapping to Physical Resources, Baseband Signal Generation, Modulation and Upconversion to obtain the first signaling.

In one embodiment, the second bit block is processed sequentially through CRC Attachment, Channel Coding, Rate Matching, Scrambling, Modulation, Mapping to Physical Resources, Baseband Signal Generation, Modulation and Upconversion to obtain the second signaling.

In one embodiment, the second bit block is processed sequentially through Bit Padding, CRC Attachment, Channel Coding, Rate Matching, Scrambling, Modulation, Mapping to Physical Resources, Baseband Signal Generation, Modulation and Upconversion to obtain the second signaling.

In one embodiment, channel coding employed to generate the first signaling and the second signaling are both polar coding.

In one embodiment, channel coding employed to generate the first signaling and the second signaling are both Convolutional coding.

In one embodiment, the first bit block is a DCI.

In one embodiment, the second bit block is a DCI.

In one embodiment, the first bit block is payload bits in a DCI.

In one embodiment, the second bit block is payload bits in a DCI.

Embodiment 9

Figure 9:
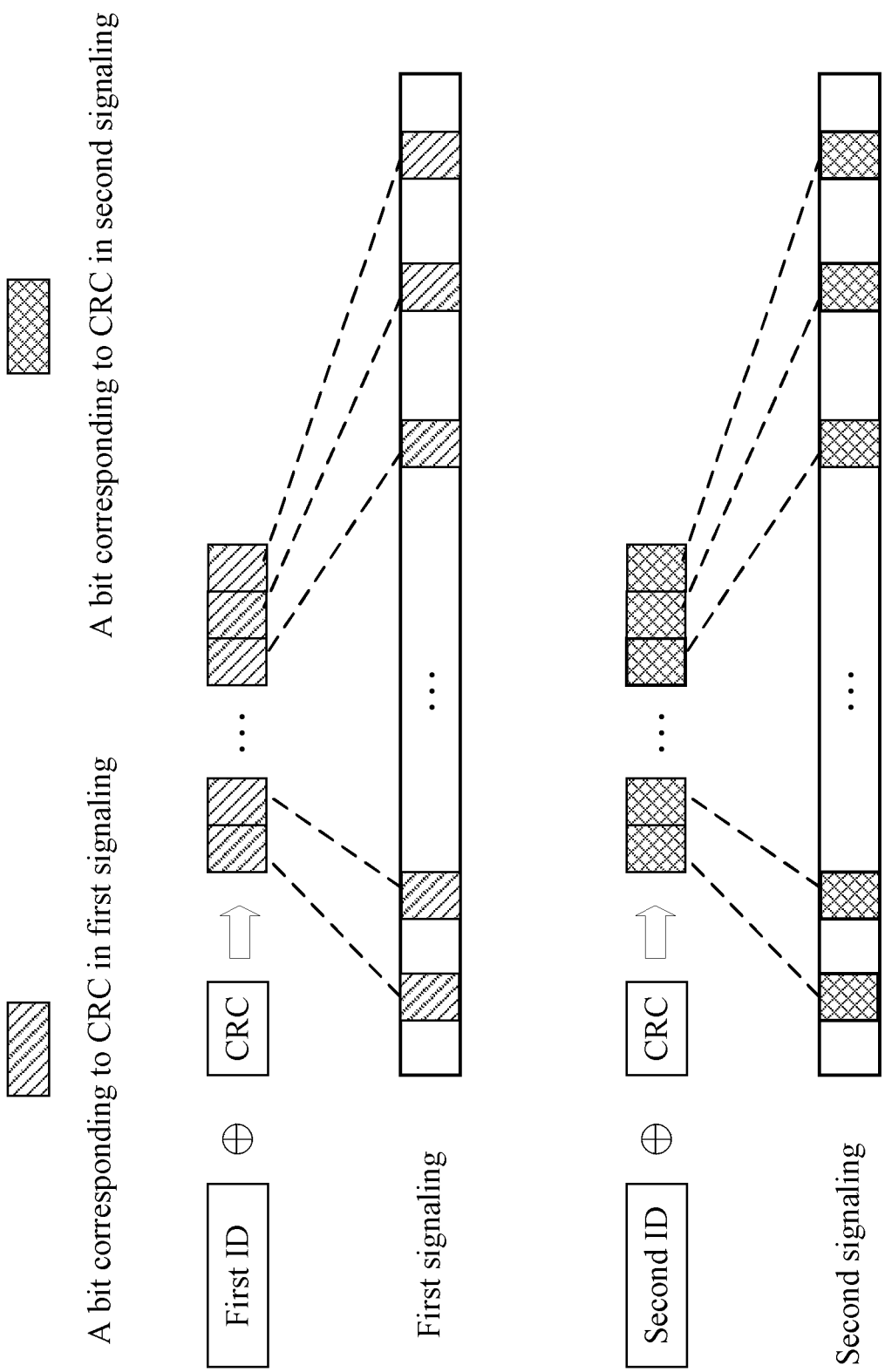
FIG. 9 is a diagram illustrating a first identification and a second identification according to one embodiment of the disclosure.

Embodiment 9 illustrates an example of a diagram of a first identification and a second identification according to one embodiment of the disclosure, as shown in FIG. 9. In FIG. 9, each rectangle filled by slashes represents a bit at a corresponding CRC position in a first signaling, and each rectangle filled by cross lines represents a bit at a corresponding CRC position in a second signaling.

In Embodiment 9, a first identification is used for the detection of the first signaling in the disclosure, a second identification is used for the detection of the second signaling in the disclosure, and the first identification is different from the second identification.

In one embodiment, the phase that the first identification is used for the detection of the first signaling refers that: the first identification is used for generating CRC bits of the first signaling.

In one embodiment, the phase that the second identification is used for the detection of the second signaling refers that: the second identification is used for generating CRC bits of the second signaling.

In one embodiment, the phase that the first identification is used for the detection of the first signaling refers that: the first identification is used for generating scrambling codes of CRC bits of the first signaling.

In one embodiment, the phase that the second identification is used for the detection of the second signaling refers that: the second identification is used for generating scrambling codes of CRC bits of the second signaling.

In one embodiment, the first identification is a System Information Radio Network Temporary Identity (SI-RNTI).

In one embodiment, the first identification is a Cell Common Radio Network Temporary Identity (CC-RNTI).

In one embodiment, the second identification is a Cell Radio Network Temporary Identity (C-RNTI).

In one embodiment, the second identification is a Configured Scheduling Radio Network Temporary Identity (CS-RNTI).

In one embodiment, the second identification is a System Information Radio Network Temporary Identity (SI-RNTI).

Embodiment 10

Figure 10:
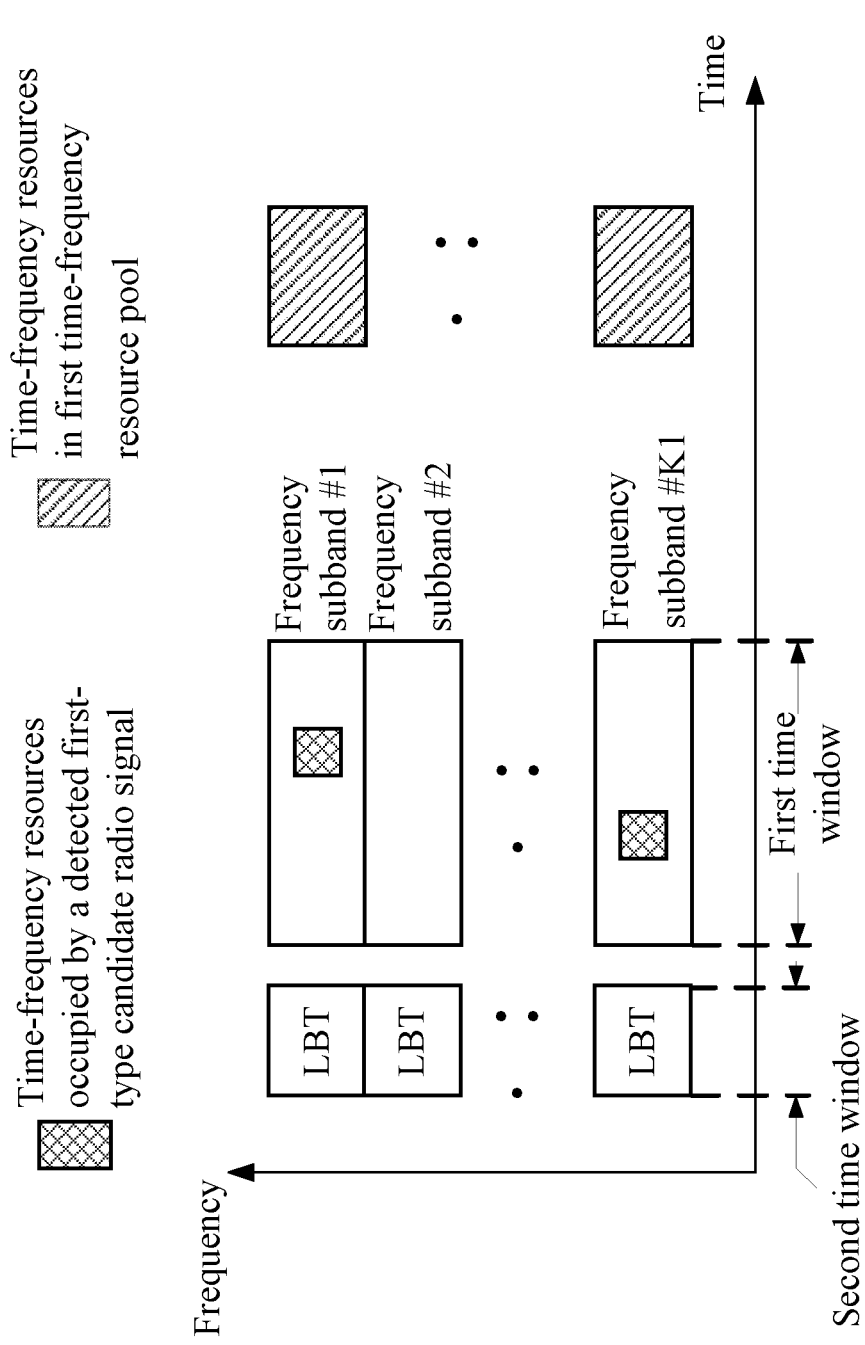
FIG. 10 is a diagram illustrating a relationship between K1 frequency subbands and a first time-frequency resource pool according to one embodiment of the disclosure.

Embodiment 10 illustrates an example of a diagram of a relationship between K1 frequency subbands and a first time-frequency resource pool according to one embodiment of the disclosure, as shown in FIG. 10. In FIG. 10, a horizontal axis represents time, a vertical axis represents frequency, each rectangle filled by cross lines represents time-frequency resources occupied by a detected first-type candidate radio signal, and a rectangle filled by slashes represents a time-frequency resource block in a first time-frequency resource pool.

In Embodiment 10, the first information in the disclosure is used for determining K1 frequency subbands, the K1 being a positive integer greater than 1; each of the K1 frequency subbands in a first time window includes a positive integer number of first-type candidate radio signal (s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool in the disclosure belong to the K2 frequency subband(s), the K2 being a positive integer not greater than the K1; output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

In one embodiment, any two of the K1 frequency subbands are different.

In one embodiment, any two of the K1 frequency subbands are orthogonal.

In one embodiment, the K1 frequency subbands are K1 frequency subbands consecutive in frequency domain.

In one embodiment, the K1 frequency subbands occupy consecutive frequency-domain resources in frequency domain.

In one embodiment, the K1 frequency subbands are K1 frequency subbands discrete in frequency domain.

In one embodiment, the K1 frequency subbands occupy discrete frequency-domain resources in frequency domain.

In one embodiment, a transmitter of the first information performs LBT on each of the K1 frequency subbands.

In one embodiment, a transmitter of the first information performs the same type of LBT on each of the K1 frequency subbands.

In one embodiment, a transmitter of the first information performs different types of LBT on two of the K1 frequency subbands.

In one embodiment, within any two of the K1 frequency subbands in the first time window, the same number of first-type candidate radio signal(s) is (are) included.

In one embodiment, within two of the K1 frequency subbands in the first time window different numbers of first-type candidate radio signal(s) are included.

In one embodiment, each first-type candidate radio signal included in the K1 frequency subbands in the first time window includes one candidate of the first signaling.

In one embodiment, each first-type candidate radio signal included in the K1 frequency subbands in the first time window includes one candidate of a PDCCH.

In one embodiment, each first-type candidate radio signal included in the K1 frequency subbands in the first time window includes one candidate within a PDCCH CSS (Common Search Space).

In one embodiment, first-type candidate radio signal(s) included in each of the K1 frequency subbands in the first time window constitutes/constitute one or more search spaces of the first signaling.

In one embodiment, all first-type candidate radio signals included in the K1 frequency subbands in the first time window constitute one search space of the first signaling.

In one embodiment, the K2 frequency subband(s) is(are) K2 consecutive frequency subband(s) among the K1 frequency subbands in frequency domain.

In one embodiment, the K2 frequency subbands are K2 discrete frequency subbands among the K1 frequency subbands in frequency domain.

In one embodiment, the phase that an entireness of the first signaling is detected in each of the K2 frequency subband(s) refers that: each of the K2 frequency subband(s) includes one first-type candidate signal of which a CRC check is passed.

In one embodiment, the phase that an entireness of the first signaling is detected in each of the K2 frequency subband(s) refers that: each of the K2 frequency subband(s) includes one first-type candidate signal of which a CRC check scrambled with a given RNTI is passed.

In one embodiment, frequency domain resources in the first time-frequency resource pool and frequency domain resources of the K2 frequency subband(s) are the same.

In one embodiment, the K2 frequency subband(s) further includes/include frequency domain resources other than the frequency domain resources in the first time-frequency resource pool.

In one embodiment, the duration of the first time window is equal to a detection periodicity of the first signaling.

In one embodiment, the duration of the first time window is configurable.

In one embodiment, the duration of the first time window is predefined.

In one embodiment, the energy detection is one time of energy detection in LBT.

In one embodiment, the K2 frequency subbands correspond to K2 energy detection thresholds respectively, and two of the K2 energy detection thresholds are different.

In one embodiment, the K2 frequency subband(s) corresponds/correspond to one same energy detection threshold.

In one embodiment, the number of times of energy detections performed on each of the K2 frequency subbands in the second time window is related to the type of LBT applied in the frequency subband.

In one embodiment, the number of times of energy detections performed on each of the K2 frequency subbands in the second time window are the same.

In one embodiment, the duration of the second time window is related to the type of LBT in the K2 frequency subband(s).

In one embodiment, the number of times of energy detections performed on two of the K2 frequency subbands in the second time window are different.

In one embodiment, the types of LBT performed on the K2 frequency subbands in the second time window are all the same.

In one embodiment, the types of LBT performed on two of the K2 frequency subbands in the second time window are different.

Embodiment 11

Figure 11:
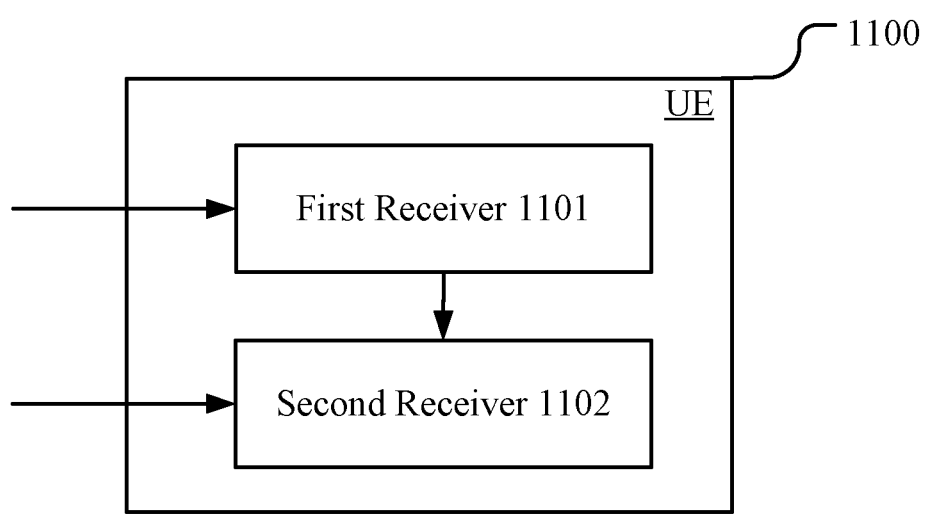
FIG. 11 is a structure block diagram illustrating a processing device in a UE according to one embodiment of the disclosure.

Embodiment 11 illustrates an example of a structure block diagram of a processing device in a UE, as shown in FIG. 11. In FIG. 11, the processing device 1100 in the UE comprises a first receiver 1101 and a second receiver 1102. The first receiver 1101 comprises the transmitter/receiver 456 (including the antenna 460), the receiving processor 452 and the controller/processor 490 mentioned in FIG. 4 of the disclosure; and the second receiver 1102 comprises the transmitter/receiver 456 (including the antenna 460), the receiving processor 452 and the controller/processor 490 mentioned in FIG. 4 of the disclosure.

In Embodiment 11, the first receiver 1101 monitors a first signaling; the second receiver 1102, when the first signaling is detected, monitors a second signaling, or receives a first radio signal; wherein the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

In one embodiment, a first bit block is used for generating the first signaling after being processed through channel coding, a second bit block is used for generating the second signaling after being processed through channel coding, the first bit block includes a positive integer number of bits, the second bit block includes a positive integer number of bits, and the number of bits included in the first bit block is smaller than the number of bits included in the second bit block.

In one embodiment, a first identification is used for the detection of the first signaling, a second identification is used for the detection of the second signaling, and the first identification is different from the second identification.

In one embodiment, the second receiver 1102 further receives a second radio signal; wherein the second signaling is used for determining at least one of time-domain resources occupied by the second radio signal and frequency-domain resources occupied by the second radio signal; and the second radio signal is transmitted via the air interface.

In one embodiment, the first receiver 1101 further receives first information; wherein the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface.

In one embodiment, the first receiver 1101 further receives first information; wherein the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface; output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

Embodiment 12

Figure 12:
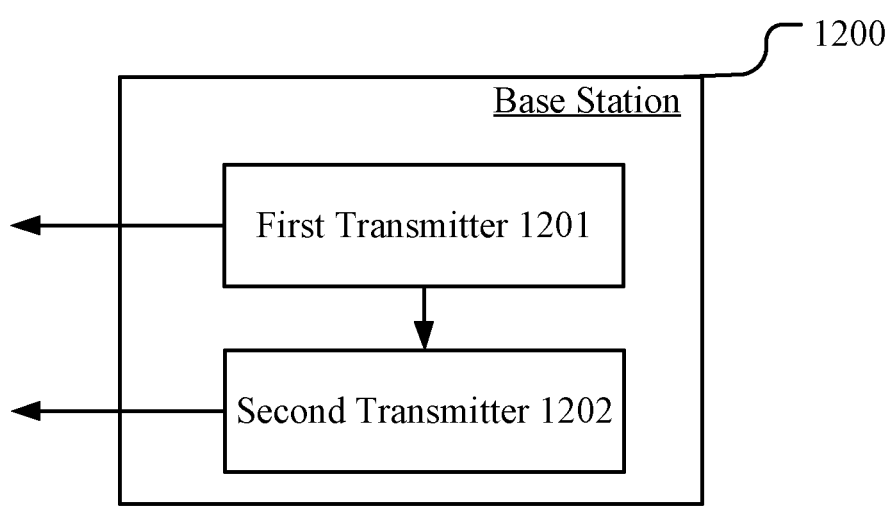
FIG. 12 is a structure block diagram illustrating a processing device in a base station according to one embodiment of the disclosure.

Embodiment 12 illustrates an example of a structure block diagram of a processing device in a base station, as shown in FIG. 12. In FIG. 12, the processing device 1200 in the base station comprises a first transmitter 1201 and a second transmitter 1202. The first transmitter 1201 comprises the transmitter/receiver 416 (including the antenna 420), the transmitting processor 415 and the controller/processor 440 mentioned in FIG. 4 of the disclosure; and the second receiver 1202 comprises the transmitter/receiver 416 (including the antenna 420), the transmitting processor 415 and the controller/processor 440 mentioned in FIG. 4 of the disclosure.

In Embodiment 12, the first transmitter 1201 transmits a first signaling; the second transmitter 1202 transmits a second signaling, or transmits a first radio signal; wherein the first signaling includes a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal; and the first signaling, the second signaling and the first radio signal are all transmitted via an air interface.

In one embodiment, a first bit block is used for generating the first signaling after being processed through channel coding, a second bit block is used for generating the second signaling after being processed through channel coding, the first bit block includes a positive integer number of bits, the second bit block includes a positive integer number of bits, and the number of bits included in the first bit block is smaller than the number of bits included in the second bit block.

In one embodiment, a first identification is used for the detection of the first signaling, a second identification is used for the detection of the second signaling, and the first identification is different from the second identification.

In one embodiment, the second transmitter 1202 further transmits a second radio signal; wherein the second signaling is used for determining at least one of time-domain resources occupied by the second radio signal and frequency-domain resources occupied by the second radio signal; and the second radio signal is transmitted via the air interface.

In one embodiment, the first transmitter 1201 further transmits first information; wherein the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface.

In one embodiment, the first transmitter 1201 further transmits first information; wherein the first information is used for determining K1 frequency subbands, the K1 being a positive integer greater than 1; each of the K1 frequency subbands in a first time window includes a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface; output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the disclosure includes but not limited to mobile phones, tablet computers, notebooks, network cards, low-power equipment, enhanced MTC (eMTC) equipment, NB-IOT equipment, vehicle-mounted communication equipment, and other wireless communication equipment. The base station or network side equipment in the disclosure includes but not limited to macro-cellular base stations, micro-cellular base stations, home base stations, relay base stations, eNB, gNB, TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising: monitoring a first signaling; and
   when the first signaling is detected, monitoring a second signaling, or receiving a first radio signal;
   wherein the first signaling comprises a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal;
   and the first signaling, the second signaling and the first radio signal are all transmitted via an air interface; and
   wherein:
      a first bit block is used for generating the first signaling after being processed through channel coding, a second bit block is used for generating the second signaling after being processed through channel coding, the first bit block comprises a positive integer number of bits, the second bit block comprises a positive integer number of bits, and the number of bits comprised in the first bit block is smaller than the number of bits comprised in the second bit block; or,
      a first identification is used for the detection of the first signaling, a second identification is used for the detection of the second signaling, and the first identification is different from the second identification.

2. The method according to claim 1, comprising:
   receiving a second radio signal;
   wherein the second signaling is used for determining at least one of time-domain resources occupied by the second radio signal and frequency-domain resources occupied by the second radio signal; and the second radio signal is transmitted via the air interface.

3. The method according to claim 1, comprising:
   receiving first information;
   wherein the first information is used for determining K1 frequency subbands, the K1 being a positive integer greater than 1; each of the K1 frequency subbands in a first time window comprises a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; the first information is transmitted via the air interface; output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

4. A method in a base station for wireless communication, comprising:
   transmitting a first signaling; and
   transmitting a second signaling, or transmitting a first radio signal;
   wherein the first signaling comprises a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal;
   and the first signaling, the second signaling and the first radio signal are all transmitted via an air interface; and
   wherein:
      a first bit block is used for generating the first signaling after being processed through channel coding, a second bit block is used for generating the second signaling after being processed through channel coding, the first bit block comprises a positive integer number of bits, the second bit block comprises a positive integer number of bits, and the number of bits comprised in the first bit block is smaller than the number of bits comprised in the second bit block; or,
      a first identification is used for the detection of the first signaling, a second identification is used for the detection of the second signaling, and the first identification is different from the second identification.

5. The method according to claim 4, comprising: transmitting a second radio signal;
wherein the second signaling is used for determining at least one of time-domain resources occupied by the second radio signal and frequency-domain resources occupied by the second radio signal; and the second radio signal is transmitted via the air interface.

6. The method according to claim 4, comprising: transmitting first information;
wherein the first information is used for determining K1 frequency subbands, the K1 being a positive integer greater than 1; each of the K1 frequency subbands in a first time window comprises a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; the first information is transmitted via the air interface; output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

7. A UE for wireless communication, comprising:
a first receiver, to monitor a first signaling; and
a second receiver, when the first signaling is detected, to monitor a second signaling, or to receive a first radio signal;
wherein the first signaling comprises a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal;
and the first signaling, the second signaling and the first radio signal are all transmitted via an air interface; and
wherein a first bit block is used for generating the first signaling after being processed through channel coding, a second bit block is used for generating the second signaling after being processed through channel coding, the first bit block comprises a positive integer number of bits, the second bit block comprises a positive integer number of bits, and the number of bits comprised in the first bit block is smaller than the number of bits comprised in the second bit block.

8. The UE according to claim 7, wherein a first identification is used for the detection of the first signaling, a second identification is used for the detection of the second signaling, and the first identification is different from the second identification.

9. The UE according to claim 7, wherein the second receiver further receives a second radio signal; wherein the second signaling is used for determining at least one of time-domain resources occupied by the second radio signal and frequency-domain resources occupied by the second radio signal; and the second radio signal is transmitted via the air interface.

10. The UE according to claim 7, wherein the first receiver further receives first information; wherein the first information is used for determining K1 frequency subbands, the K1 being a positive integer greater than 1; each of the K1 frequency subbands in a first time window comprises a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface.

11. The UE according to claim 10, wherein output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

12. A base station for wireless communication, comprising:
a first transmitter, to transmit a first signaling; and
a second transmitter, to transmit a second signaling, or transmit a first radio signal;
wherein the first signaling comprises a first field; the first signaling carries first sub-information besides the first field, or the first signaling carries second sub-information besides the first field; the first field in the first signaling is used for determining whether the first sub-information or the second sub-information is carried in the first signaling; the first sub-information is used for determining a first time-frequency resource pool, time-frequency resources occupied by the second signaling belong to the first time-frequency resource pool, and the second sub-information is used for determining time-frequency resources occupied by the first radio signal;
and the first signaling, the second signaling and the first radio signal are all transmitted via an air interface; and
wherein a first bit block is used for generating the first signaling after being processed through channel coding, a second bit block is used for generating the second signaling after being processed through channel coding, the first bit block comprises a positive integer number of bits, the second bit block comprises a positive integer number of bits, and the number of bits comprised in the first bit block is smaller than the number of bits comprised in the second bit block.

13. The base station according to claim 12, wherein a first identification is used for the detection of the first signaling, a second identification is used for the detection of the second signaling, and the first identification is different from the second identification.

14. The base station according to claim 12, wherein the second transmitter further transmits a second radio signal; wherein the second signaling is used for determining at least one of time-domain resources occupied by the second radio signal and frequency-domain resources occupied by the second radio signal; and the second radio signal is transmitted via the air interface.

15. The base station according to claim 12, wherein the first transmitter further transmits first information; wherein the first information is used for determining K1 frequency subbands, the K1 being a positive integer greater than 1; each of the K1 frequency subbands in a first time window comprises a positive integer number of first-type candidate radio signal(s), a receiver of the first information assumes that each first-type candidate radio signal in the K1 frequency subbands carries an entireness of the first signaling, and monitors the first signaling in the first-type candidate radio signal(s) in the K1 frequency subbands; each frequency subband among K2 frequency subband(s) is one of the K1 frequency subbands, an entireness of the first signaling is detected in each of the K2 frequency subband(s), and frequency-domain resources in the first time-frequency resource pool belong to the K2 frequency subband(s), the K2 being a positive integer not greater than the K1; and the first information is transmitted via the air interface.

16. The base station according to claim 15, wherein output(s) of a positive integer number of time(s) of energy detection(s) performed on each of the K2 frequency subband(s) by a transmitter of the first information in a second time window is(are) all less than an energy detection threshold corresponding to the frequency subband, and an end time of the second time window is not later than a start time of the first time window.

\* \* \* \* \*